May 31, 1927. 1,630,773
A. VAN GALE
COMBINATION DIVIDER
Filed Dec. 27, 1922
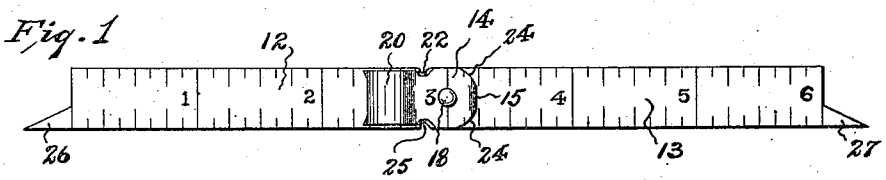
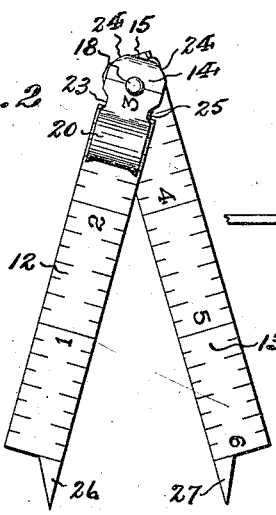
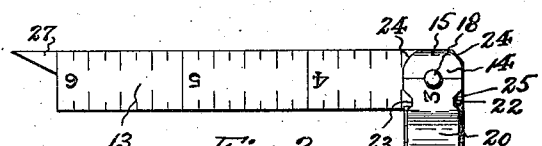
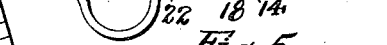
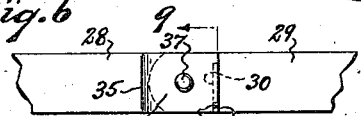
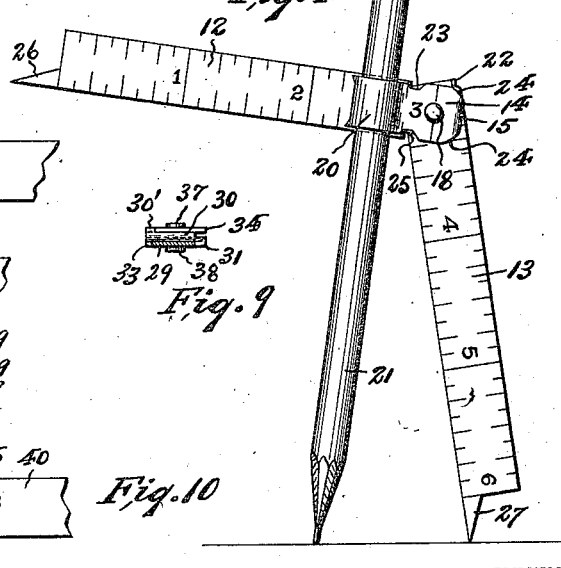
INVENTOR.
Alfred Van Gale,
BY
Frantzel and Richards
ATTORNEYS.

Patented May 31, 1927.

1,630,773

UNITED STATES PATENT OFFICE.

ALFRED VAN GALE, OF NEWARK, NEW JERSEY.

COMBINATION DIVIDER.

Application filed December 27, 1922. Serial No. 609,195.

This invention relates, generally, to improvements in combination dividers for draughtsmen, mechanics and other artisans.

The invention has for its principal object to provide a cheap and yet efficient and handy tool for the purposes in view, which may be used as a straight edge, as dividers, as a square or as a compass; and the invention has for a further object to provide a novel and exceedingly simple friction pivotal connection between the movable members of the device whereby said members may be easily and quickly adjusted to various positions, but will nevertheless efficiently retain or hold the position to which they have been adjusted.

Other objects of this invention, not at this time more particularly enumerated, will be clearly understood from the following detailed description of the same.

With the various objects of the invention in view, the same consists, primarily, in the novel combination dividers hereinafter set forth; and, the invention consists, furthermore, in the novel arrangements and combinations of the several devices and parts, as well as in the details of the construction of the same, all of which will be more fully described in the following specification, and then finally embodied in the claims appended thereto.

The invention is clearly illustrated in the accompanying drawings, in which:—

Figure 1 is a face view of the novel tool or instrument made according to and embodying the principles of this invention, the same being adjusted to serve as a straight edge; Figure 2 is a similar view, showing the same adjusted to serve as dividers; Figure 3 is a similar view, showing the same adjusted to serve as a square; and Figure 4 is a similar view, showing the same adjusted to serve as a compass; Figure 5 is a fragmentary edge elevation, on an enlarged scale, of the pivotal connection or joint of the tool or instrument. Figure 6 is a fragmentary obverse face view of a modified form of connection or joint; Figure 7 is a reverse face view of the same; Figure 8 is an edge elevation of the same; and Figure 9 is a transverse section through the same, taken on line 9—9 in Figure 6. Figure 10 is a fragmentary face view of another modified form of connection or joint; and Figure 11 is an edge elevation of the same.

Similar characters of reference are employed in all of the hereinabove described views, to indicate corresponding parts.

Referring now more especially to Figures 1 to 5 inclusive, there is illustrated therein, one form of the novel tool or instrument embodying the principles and features of this invention, the same comprising essentially a pair of flat members or legs 12 and 13 respectively. The inner ends of said respective members or legs 12 and 13 are arranged together in mutually overlapping relation. Integrally connected with the inner end of the member or leg 12 is a spring or tension washer element 14, which is doubled outwardly and over the outer face of the member or leg 12, thus forming a loop connection 15 which slightly spaces the outer portion of the washer element 14 from the body of the member or leg 12, while the opposite free end 16 of said washer element 14 converges toward and contacts with said outer face of said member or leg 12. Extending through said overlapping ends of the members or legs 12 and 13 and through the body of said washer element 14 is the shank 17 of a pivoting rivet having at its respective ends exterior heads 18 and 19. When the rivet is headed over, the washer element is subjected to a permanent tension whereby it thrusts outwardly upon the head 18 to draw upon the opposite head 19 and thus force the meeting surfaces of the overlapping ends of the members or legs 12 and 13 into a strong frictional engagement or contact one with the other. The frictional engagement or contact thus established at the connecting joint between the members or legs 12 and 13 permits the same to be adjusted to various positions in relation one to the other, when sufficient force is applied thereto to overcome such established frictional resistance, but when the desired adjustment is made the established frictional resistance tends to efficiently hold the members or legs against accidental displacement therefrom. Connected with the free end 16 of said washer element 14 is a transverse socket clip or yoke 20 which is opposed to and which cooperates with the face of the member or leg 12 to provide a means to receive and hold a pencil 21 or other marking element when it is desired to utilize the tool or instrument as a compass. In order to provide a means for determining the proper relative positions of the members or legs 12 and 13, when utilizing the tool or instrument as a straight edge or square, the following elements are provided. Integrally formed and struck from the inner end of said member or leg 13, at a corner thereof beyond the point of its pivotal connection with the member or leg 12, is an upwardly turned stop-lug 22 which projects from the member or leg 13 toward the opposed leg or member 12. The marginal portion of one side of said member or leg 12, and also if desired, the adjacent overlying edge of the washer element 14, is cut away to provide a receiving notch 23 in which said stop-lug 22 is received and seated when the members or legs 12 and 13 are turned to longitudinally alined relation one to the other to thus provide a straight edge, as shown in Figure 1 of the drawings. The outer corners of the inner extremity of the member or leg 12 where joined by the washer element 14 are cut away, as at 24, to thus permit such parts to clear the stop-lug 22 when the members are turned to adjust the same in angular relation one to the other. The marginal portion of the opposite side of said member or leg 12, and also if desired, the adjacent overlying edge of the washer element 14, is likewise cut away to provide a second receiving notch 25 in which said stop lug 22 is received and seated when the members or legs 12 and 13 are turned to adjust the same at right angles one to the other to thus provide a square, as shown in Figure 3 of the drawings. Projecting longitudinally outward from the outer free extremity of the member or leg 12, and in alinement with one longitudinal edge thereof, is a sharpened spur or point 26, and, in like manner the free extremity of the member or leg 13 is also provided with a similar sharpened spur or point 27. As shown in Figure 2 the members or legs 12 and 13 may be adjusted at various angles divergent from the intermediate pivotal connection, so that the tool or instrument may be used as dividers, the sharpened spurs or points 26 and 27 constituting the free terminals of the members or legs when the tool or instrument is so employed.

Referring now to Figure 4 of the drawings, the tool or instrument is shown with a pencil 21 operatively engaged by the yoke or clip 20 to attach the same to the member or leg 12, so that the pencil may be employed in conjunction with the other member or leg 13 to convert the tool or instrument for use as a marking compass, as will be understood.

Referring now, more especially, to Figures 6 to 9 inclusive, there is shown therein a somewhat modified arrangement and construction of friction joint or pivotal connection for the members or legs of the tool or instrument. In these views, the reference character 28 indicates one member or leg and 29 the other member or leg. The inner ends of said respective members or legs 28 and 29 are arranged together in mutually overlapping relation. The extremity of the inner end of the member or leg 28 is turned outwardly for the greater portion of its extent to provide a bearing abutment or support 30. The remaining portion of said extremity is turned downwardly or inwardly toward the other member or leg 29 to provide a stop-lug 31, which cooperates with either the notch 32 at one side margin of the member or leg 29 to determine the relative positions of both members or legs 28 and 29 when disposed to arrange the tool or instrument as a straight edge, or with the notch 33 at the opposite side margin of the member or leg 29 to determine the relative positions of both members or legs 28 and 29 when disposed to arrange the tool or instrument as a square. The reference character 34 indicates a spring or tension washer, the outer end of which is supported on the abutment or support 30, while the inner end of which has an inwardly turned marginal edge 35 which contacts with the outer face of the member or leg 28, thus supporting the intermediate body of the tension washer spaced outwardly from the face of the member or leg 28. Extending through said overlapping ends of the members or legs 28 and 29 and through the body of said tension washer 34 is the shank 36 of a pivoting rivet having at its respective ends exterior heads 37 and 38. When the rivet is headed over, the washer element 34 is subjected to a permanent tension, whereby it thrusts outwardly upon the head 37 to draw upon the opposite head 38 and thus force the meeting surfaces of the overlapping ends of the members or legs 28 and 29 into a strong frictional engagement or contact one with the other, which, while permitting pivotal movement of the members or legs to effect desired adjustment thereof, will nevertheless tend to maintain the same against accidental displacement from the positions to which they have been adjusted. In order to prevent rotary displacement of the tension washer, i. e., turning of the same upon the rivet independently of the member or leg 28, the abutment or support 30 is provided at one end with an upward extension or tongue 30', and the tension washer is provided with a notch or seat 34' to receive said extension or tongue 30', thus interlocking the washer to the member or leg against independent rotary movement.

Referring now to Figures 10 and 11, there is shown therein another modification of the tension washer element, together with a modified form and relation of pencil holding clip or yoke, which embody, however, the general principles of this invention. In these views, the reference characters 39 and 40 respectively indicate the members or legs of the tool or instrument, the inner ends of which are mutually overlapping. The reference character 41 indicates the tail-piece or base of a pencil clip or yoke member 42. The tail-piece or base 41 is placed upon the outer face of the member or leg 39, and the same is provided at its outer end with a lateral outwardly turned stop-rib 43. Arranged to extend over said tail-piece or base 41 is a spring or tension washer element 44, which possesses downwardly or inwardly turned ends 45 and 46 which tend to space the body of the washer away from the face of the member or leg. When the parts are assembled, the inwardly turned end 45 of the washer is engaged against the stop-rib 43, thus holding the washer against independent rotary movement relative to the base or tail-piece of the pencil clip or yoke. Extending through said overlapping ends of the members or legs 39 and 40 and through the body of the washer 44 is the shank 47 of a pivoting rivet having at its respective ends exterior heads 48 and 49. When the rivet is headed over, the washer element 44 is subjected to a permanent tension, whereby it thrusts outwardly upon the head 48 to draw upon the opposite head 49 and thus force the meeting surfaces of the overlapping ends of the members 39 and 40 into a strong frictional engagement or contact one with the other, and also forcing the meeting faces of the member or leg 39 and pencil clip or yoke base 41 into a like strong frictional engagement or contact one with the other, all to the end that desired pivotal adjustments of the members or legs 39 and 40 with relation to each other, as well as desired pivotal adjustment of the pencil clip or yoke relative to the members or legs, may be made, while nevertheless tending to maintain such parts against accidental displacement from the positions to which they may have been adjusted.

From the above description it will be quite evident that this invention, in its several embodiments as above described, provides a very simple, cheap and yet efficient combination tool or instrument adapted to serve the several purposes as described, and one which because of its novel structure may be made of sheet metal stampings with a minimum outlay of time, labor and material.

I am aware that some changes may be made in the construction of the novel tool or instrument, other than those above specified. Hence, I do not limit my invention to the exact arrangements and combinations of the various devices and parts as described in the said specifications, nor do I confine myself to the exact details of the construction of the various detail parts as illustrated in the accompanying drawings.

I claim:—

1. In a device of the kind described, a pair of leg members made of flat stock and having their inner ends in mutually overlapping relation, a pivotal rivet joining said inner ends of said leg-members, one of said leg-members having a stop-lug, the other of said leg-members having on one side a stop notch engageable by said stop lug to hold said leg-members in a relative extension of one hundred and eighty degrees and having on the opposite side a second stop notch engageable by said stop lug to hold said leg-members in relative extension of ninety degrees, a tension element interposed between one end of said rivet and said leg-members which is adapted to force the meeting surfaces of said leg-members into strong frictional mutual engagement, and each leg-member having a longitudinally projecting sharpened spur at its free end.

2. In a device of the kind described, a pair of leg-members made of flat stock and having their inner ends in mutually overlapping relation, the inner end of one of said leg-members being doubled back outwardly over itself with its free end in contact with the outer surface of said leg-member to form an integral tension element, and a pivot rivet passing through said overlapping inner ends of said leg-members and said tension element and headed down over the latter to subject the same to a permanent tension whereby the meeting surfaces of said leg-members are forced into strong frictional mutual engagement.

3. In a device of the kind described, a pair of leg-members made of flat stock and having their inner ends in mutually overlapping relation, the inner end of one of said leg-members being doubled back outwardly over itself with its free end in contact with the outer surface of said leg-member to form an integral tension element, and a pivot rivet passing through said overlapping inner ends of said leg-members and said tension element and headed down over the latter to subject the same to a permanent tension whereby the meeting surfaces of said leg-members are forced into strong frictional mutual engagement, the other leg-member having a longitudinally projecting sharpened spur at its free end, and a pencil holding clip member integrally connected with the free end of said tension element.

4. In a device of the kind described, a pair of leg-members made of flat stock and having their inner ends in mutually overlapping relation, the inner end of one of said leg-members being doubled back outwardly over itself with its free end in contact with the outer surface of said leg-member to form an integral tension element, and a pivot rivet passing through said overlapping inner ends of said leg-members and said tension element and headed down over the latter to subject the same to a permanent tension whereby the meeting surfaces of said leg-members are forced into strong frictional mutual engagement, one of said leg-members having a stop-lug at its inner extremity, and the other leg-member having on one side a stop notch engageable by said stop lug to hold said leg-members in a relative extension of one hundred and eighty degrees and having on the opposite side a second stop notch engageable by said stop lug to hold said leg-members in relative extension of ninety degrees.

In testimony, that I claim the invention set forth above I have hereunto set my hand this 21st day of December, 1922.

ALFRED VAN GALE.